Feb. 26, 1929.
R. S. BLAIR ET AL
1,703,289
TRACK GAUGING APPARATUS
Filed Sept. 20, 1921
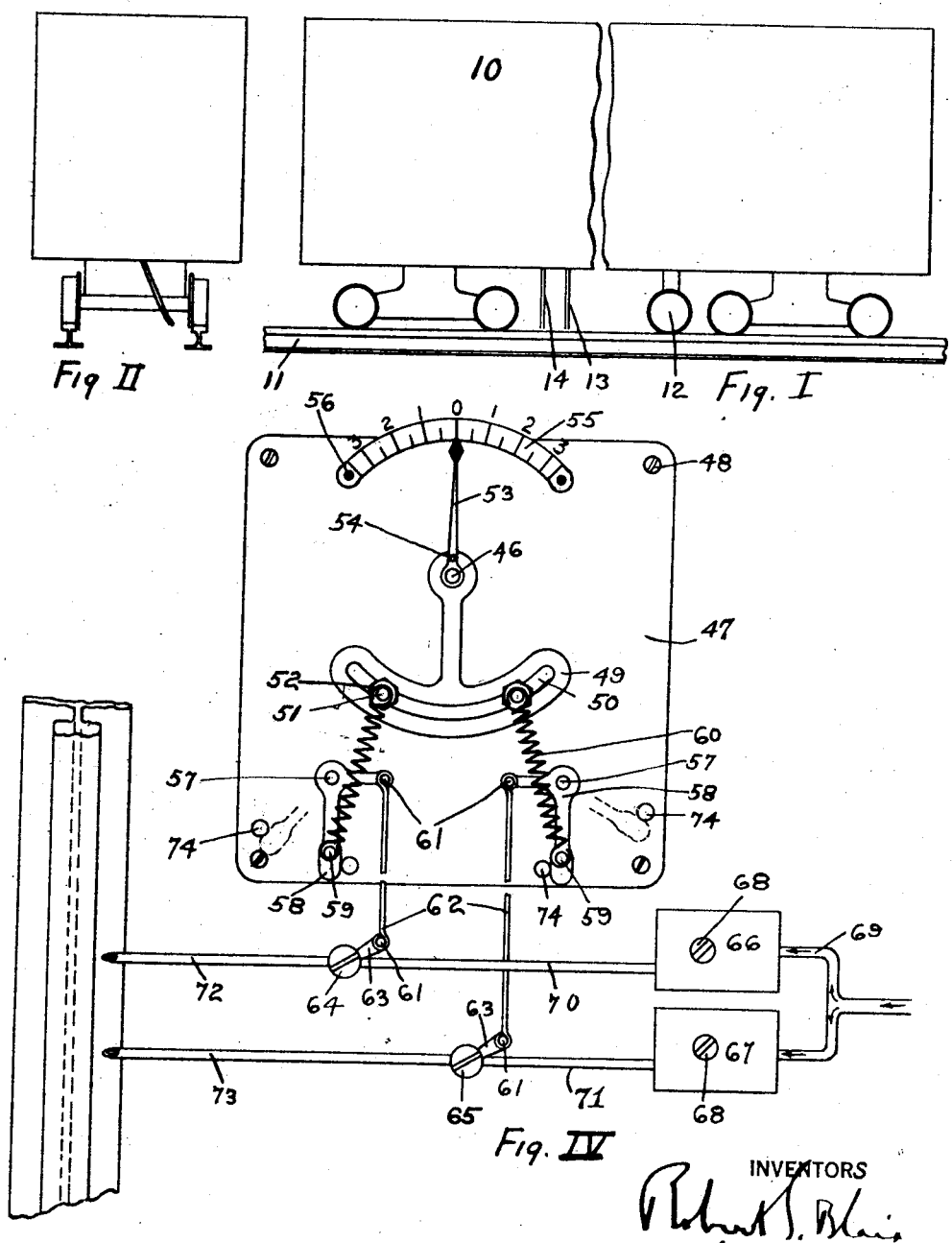

Feb. 26, 1929. 1,703,289
R. S. BLAIR ET AL
TRACK GAUGING APPARATUS
Filed Sept. 20, 1921  2 Sheets-Sheet 2
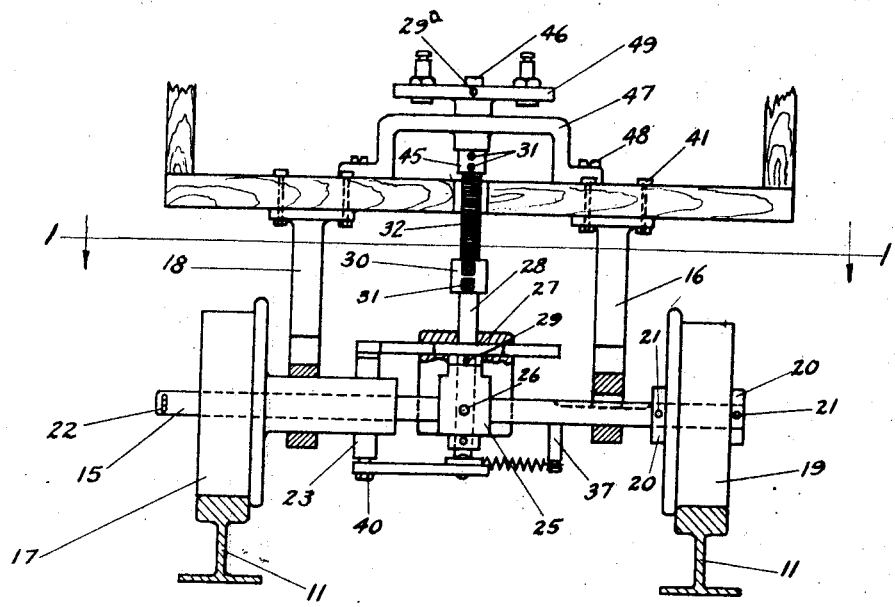
Fig. III
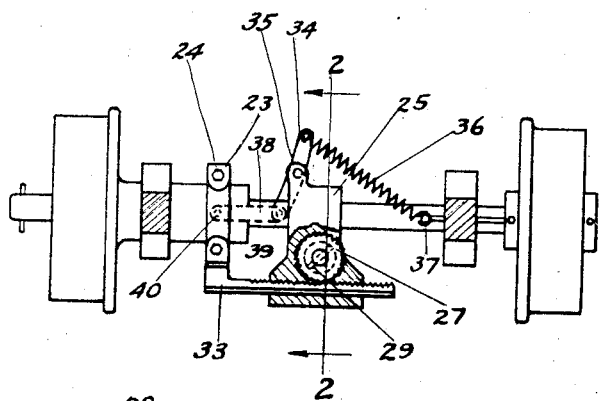
Fig. V
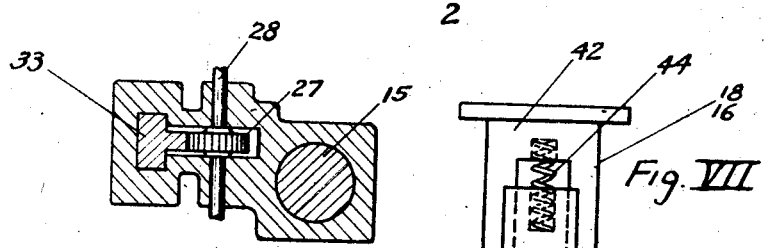
Fig. VI  Fig. VII
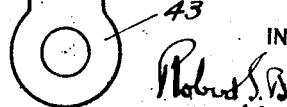
INVENTORS
Robert S. Blair
Burling D. Wells Patented Feb. 26, 1929.

1,703,289

UNITED STATES PATENT OFFICE.

ROBERT S. BLAIR, OF STAMFORD, AND BURLING D. WELLS, OF DANBURY, CONNECTICUT; SAID WELLS ASSIGNOR TO SAID BLAIR.

TRACK-GAUGING APPARATUS.

Application filed September 20, 1921. Serial No. 501,934.

This invention relates to track gauging apparatus and with regard to certain features thereof more particularly to gauges for automatically gauging the distance between the rails of railroad tracks and leaving a visible mark thereon as an indication of the result of the gauging operation.

One of the objects thereof is to provide track gauging apparatus of simple and practical construction and efficient in operation. Another object is to provide track gauging apparatus adapted to automatically gauge distance between the rails of the railroad track along which the car bearing said apparatus is moving at a reasonable rate of speed. Another object is to provide track gauging apparatus of such type as may be attached to an ordinary test car. Another object is to provide an automatic track gauging apparatus which will make permanent visible indication on the track which is being gauged whenever the distance between the rails exceeds by more than the standard tolerance the standard gauge. Other objects will be in part obvious and in part pointed out hereinafter.

The invention accordingly consists in the features of construction, combination of elements and arrangement of parts which will be exemplified in the structure hereinafter described and the scope of the application of which will be indicated in the following claims.

In the accompanying drawings in which is shown one of various possible embodiments of this invention, Figure I is a diagrammatic side elevation of a test car having mounted therein track gauging apparatus. Figure II is an end view in elevation of the test car shown in Figure I. Figure III is an end elevation of the gauging mechanism of the track gauging apparatus mounted on the bottom of a test car, a portion of the lower part of the test car is shown diagrammatically. Figure IV is a diagrammatic plan view of the indicating part of the track gauging apparatus. Figure V is a plan view in cross section of the track gauging apparatus shown in Figure III the section being taken along the line 1—1 in the direction as indicated by the arrows. Figure VI is a cross sectional view in elevation of a portion of the track gauging apparatus the section being taken along the line 2—2 in the direction as indicated by the arrows in Figure V. Figure VII is a side elevation of one of the brackets which attach the gauging mechanism to the bottom of the test car.

Similar reference characters refer to similar parts throughout in the several views of the drawings.

Turning now to the accompanying drawings we have in Figure I a test car 10 running on a track 11 and having mounted on the under side thereof track gauging apparatus 12. A pair of tubes 13 and 14 are arranged to conduct a colored liquid and cause the same to impinge on the inside of the web of one of the rails of the track 11, the lower ends thereof being arranged at a sufficient height above the top of the track 11 that whenever the test car 10 rolls over a switch they will not come into contact with any part thereof. Turning now to Figure III we have a shaft 15 the right hand end thereof being slidably mounted in the bracket 16 and splined therein to prevent relative rotary movement therewith, the other end thereof has journaled thereon a wheel 17, the hub thereof is elongated and journaled in a bracket 18 so that the hub of the wheel 17 is free to slide either to the right or to the left therethrough. A similar wheel 19 is journaled on the right hand end of the shaft 15 and is prevented from relative axial movement therewith by the collars 20 which are fastened to the shaft 15 by means of set screws such as 21 and is free to revolve independently of the shaft 15. A split pin 22 in the end of the shaft 15 prevents the wheel 17 from sliding therefrom whenever the wheels 17 and 19 are not in engagement with the rails of the track 11. The right hand end of the hub of the wheel 17 has a groove turned in its circumference and a split collar 23 is journaled therein, the two parts of the split collar are held together by screws such as 24 as is more clearly shown in Figure V. A gear box 25 is securely pinned to the shaft 15 by means of a pin 26 driven therethrough, the gear box 25 being so positioned on the shaft 15 that whenever the test car 10 is on a straight portion of the track it will be midway between the brackets 16 and 18. The gear box 25 is provided with a recess which contains a gear 27 pinned on to the shaft 28 by means of a pin 29, the shaft passing through the gear box 25 and journaled therein extends upwardly towards the bottom of the test car 10 and carries at its upper end a sleeve 30, one end of which is secured thereto by a set screw 31 and has the other end thereof secured to the flexible shaft 32 which passes up through the bottom of the test car 10 and is secured by means of a similar set screw 31. Turning now to Figure V which shows the mechanism contained in the gear box 25 more clearly, there is a rack 33, the back of which is in sliding contact with one end of the recess in the gear box 25 which contains the gear 27 and has teeth on the side opposite from that which bears against the gear box 25, meshing with the teeth on the gear 27, the left hand end of the rack 33 being secured to the split collar 23 by being clamped thereto by one of the bolts 24 which holds the two parts of the split collar together. A lever 34 swiveled at its mid point about the pin 35 which is fixed in the projection of the gear box 25 is provided with a hole in its two ends through one of which is hooked a spiral spring 36 the other end of which is hooked over the stud 37 in the shaft 15, the other end of the lever 34 is connected to the split collar 23 by the link 38, the link 38 being connected to the lever 34 by a pin 39 and at its other end to the split collar 23 by means of a screw 40. The brackets 16 and 18 which are fastened to the bottom of the test car 10 by means of bolts such as 41 are so constructed that the wheels 17 and 19 are always firmly held down against the track 11 by means of spring pressure. The way in which this is accomplished is clearly shown in Figure VII which is an enlarged detail of one of the brackets 16 and 18. The brackets 16 and 18 are made in two sections: the guide 42 and the slide 43 which is fitted into the slot in the guide 42 and is free to move up and down therein whenever sufficient force is applied thereto to compress the spring 44 which at all times tends to hold the slide 43 and the shaft 15 which is journaled in the lower end thereof, and the wheels 17 and 19 journaled thereon down against the track 11. Flanges on each side of the slide 43 which is in sliding engagement with the guide 42 prevent relative side movement between the slide 43 and the guide 42. The spiral spring 44 is nested in the recesses in the guide 42 and the slide 43 so that the maximum length of spring may be used. Turning now to Figure VI which is a cross section of the gear box 25 taken along the line 2—2 in the direction as indicated by the arrows, the manner in which the shaft 28 is journaled therein and the rack 33 meshing with the gear 27 on the shaft 28 is clearly shown in detail. Returning now to Figure III the upper end of the flexible shaft 32 extending through the floor of the test car 10 has secured thereon by means of a set screw 31 a sleeve 45 the upper end of which is slipped over the lower end of the shaft 46 and is secured thereto by means of a similar set screw 31. Shaft 46 is journaled in the plate 47 which is screwed to the floor of the test car 10 by screws such as 48, the upper end of the shaft 46 where it extends above the plate 47 has pinned thereon a quadrant 49 by means of a pin 29ª. Turning now to Figure IV which shows the mechanism in plan which is arranged on the floor of the test car 10, there is clamped in the slot 50 of the quadrant 49 a pair of studs 51 which by loosening the nuts 52 thereon may be moved to any desired position in the slot 50. The slot 50 is circular in shape being described about the center of the shaft 46 as an axis. A pointer 53 has one end slipped over the shaft 46 where it projects through the quadrant 49 and is secured thereto by means of a screw 54, a circular scale 55 is fastened to the plate 47 by rivets such as 56 in a suitable position so that as the pointer 53 swings to the right or left with the shaft 46 and the quadrant 49 its indicating end will lie just above the graduations on the scale 55, the graduations thereon being arranged increasing to the right or left from the center thereof which is considered as zero. A pair of studs 57 in the plate 47 have swiveled thereon a pair of bell cranks 58. One arm of the bell cranks 58 have fixed therein studs such as 59 which have hooked thereon one end of the spiral spring 60, the other ends thereof being hooked over the studs 51 in the slot 50 of the quadrant 49. The bell cranks 58 are arranged as shown in Figure IV with two of their arms parallel to each other and pointing in the same direction; the other two arms thereof as shown point towards each other and have connected thereto by means of pins such as 61 a pair of links 62, the other ends of the links 62 hooking over similar pins 61 in the ends of the valve handles 63 of the valves 64 and 65. A pair of tanks 66 and 67 provided with filler plugs 68 are connected to a source of air pressure by the pipes 69, the tank 66 is connected with the valve 64 by the pipe 70 and the tank 67 to the valve 65 by the pipe 71. A pair of nozzles 72 and 73 are connected to the valves 64 and 65 respectively and are arranged on the bottom of the test car 10 as shown in Figure I so as to direct a stream of liquid which may pass therethrough against the inside of the web of the track 11. Pins such as 74 are fastened in the plate 47 in suitable positions to limit the movement of the bell cranks 58 so that the valves 64 and 65 connected thereto by the links 62 will be held at either the on or off position and not at any intermediate position.

The action of the track gauging apparatus is substantially as follows: The apparatus has been designed with the idea in view of attaching it to the bottom of a standard test car which is very commonly run over the railroad lines to gauge the various clearances and other conditions existing on the tracks and it was intended that it shall be operable at a reasonable speed such as is satisfactory for the operation of the other measuring devices in a test car 10 which are not described herein as being beyond the scope of this invention. Let us consider a track gauging apparatus mounted on the test car 10 as shown in Figure I and the test car moving forward over the track 11. Turning now to Figure III it will be seen that the wheels 17 and 19 will be securely held in rolling contact with the top of the rails of the track 11 by means of the spiral spring 44 in the brackets 16 and 18 which reacting against the guide 42 as shown in Figure VII presses the slide 43 and the shaft 15 journaled therein and the wheels 17 and 19 journaled thereon downwards. During a forward movement of the test car 10 the distance between the top of the track 11 and the bottom of the test car 10 will be constantly changing as no track is absolutely level and will be compensated for by the springs 44 as above described. When the lateral displacement of the test car 10 with respect to the rails 11 takes place as would occur when a curve is being traversed a sideward movement of the wheels 17 and 19 relative thereto would be necessary as above described and is rendered possible by the provision which has been made for the shaft 15 to slide in an axial direction in the brackets 16 and 18. The flanges of the wheels 17 and 19 would at all times be pressed against the inside edges of the head of the rails of the track 11 by means of the spring 36 one end of which being anchored to the stud 37 in the shaft 15, pulls on one end of the lever 34 and causes it to rotate in a clockwise direction about the pin 35 mounted in the gear case 25, the other end of the lever 34 as it rotates about the pin 35 moves in a direction towards the wheel 17 and forces it over to the left so that its flange makes rolling contact with the inside edge of the head of the rail upon which it rolls by reason of the link 38 connecting the split collar 23 to the end of the lever 34 by means of the pin 39 and the screw 40. The reaction of the lever 34 to the right on the pin 35 in the gear case 25 as the end thereof in which the pin 39 is located exerts a force towards the left, forces the gear case 25 in which the pin 35 is mounted over to the right carrying the shaft 15 along with it as the gear case 26 is firmly pinned to the shaft 15 by means of the pin 26, the shaft 15 in being thrust over towards the right slides in an axial direction through the hub of the wheel 17 and the lower end of the bracket 16 and the collar 20 fastened thereto by the set screw 21 bears against the inside face of the hub of the wheel 19 and forces it over to the right so that the flange thereon comes into rolling contact with the inside edge of the head of the rail on which it is rolling. A similar collar 20 fastened on the shaft 15 where it projects through the wheel 19 and the split pin 22 in the other end thereof are provided as precautionary measures only to retain the wheels 17 and 19 on the ends of the shaft 15 if for any reason they should be lifted up clear of the track 11. If the test car 10 should traverse a portion of track which should have an increasing distance between the rails thereof the wheel 17 will slide along the shaft 15 away from wheel 19 in the manner above described, the force necessary to do this being provided by the spiral spring 36 as shown in Figure V and conversely should the test car traverse a section of the track where the distance between the rails thereof diminishes the wheel 17 will slide along the shaft 15 toward the wheel 19 and extending the spiral spring 36 by the operation of the linkage connected therewith as above described. The movement of the wheel 17 along the shaft 15 which was caused by the wheels 17 and 19 rolling over a section of the track where the gauge thereof is non-uniform will cause a corresponding rotary movement of the shaft 28 by means of the rack 33 which is fastened to the split collar 23 of the hub of the wheel 17 by the screw 24 sliding in and out of the gear case 25 and meshing with the gear 27 pinned to the shaft 28 by a pin 29 and causing a limited rotary movement thereof. Let us consider the action of the track gauging apparatus as the test car 10 rolls over a section of the track where the distance between the rails diminishes which causing the wheels 17 and 19 to approach each other causes the hub of the wheel 17 to approach the gear case 25 and the rack 33 consequently to slide therein and cause an anti-clockwise rotation of the shaft 28 in turn causing the quadrant 49 to swing in a similar direction being connected to the shaft 46 to which the quadrant 49 is pinned by the pin 29 through the flexible shaft 32 which is rigidly connected at each end to the shafts 28 and 46 by means of sleeves 30 and 45 and the set screws such as 31. The flexible shaft 32 is of that type which permits relative displacement of the ends thereof but permits no relative torsional displacement of the ends thereof, thus movement of the shaft 15 and the mechanism mounted thereon either to the right or left of the test car 10 will leave the shaft 28 in rigid torsional connection with the shaft 46. When the wheels 17 and 19 roll over a section of the track 11 where the space between the rails thereof increases a clockwise rotation of the quadrant 49 will be caused in a manner just the reverse of that above described, the apparatus has been so designed that when the wheels 17 and 19 are rolling over a section of the track 11 where the space between the rails is of the standard gauge the pointer 53 shown in Figure IV which is fastened to the quadrant 49 by the screw 54 will have its indicating end in line with the zero graduation on the scale 55 thus indicating that the section of the track upon which the test car 10 at that moment is rolling is standard. The action of the gauging apparatus having now been described we will consider the operation of the apparatus provided for marking on the inside of the web of the rails of the track 11 some indication of the condition of the gauge of the track at that point, this apparatus is shown in Figure IV. The position of the bell cranks 58 and the springs 60 as shown in Figure IV when the pointer 53 is in line with the zero graduation on the scale 55 is such that the ends thereof in which are mounted the pins 59 over which the end of the springs 60 are hooked are firmly held up against the pair of the pins 74 which are nearest to each other by reason of the center line of the springs 60 lying to that side of the studs 57, in this position the valves 64 and 65 which are connected to the bell cranks 58 by means of the links 62 and the pins 61 in the ends of the handles 63 of the valves 64 and 65 and the bell cranks 58 are held in a closed position so that the liquid contained in the tanks 66 and 67 cannot be driven therefrom by air pressure conducted thereto through the pipe 69 out through the pipes 70 and 71, the valves 64 and 65 and the nozzles 72 and 73 and therefrom against the inside of the web of a rail of the track 11. If the test car 10 now rolls over a section of the track 11 where the rails are a less distance apart than the standard gauge, the shaft 46 will be caused to rotate to a corresponding amount in a counter-clockwise direction as above described, which as it rotates carries the quadrant 49 and the pointer 53 fastened thereto with it. The shaft 46 as it rotates in a counter-clockwise direction causes the slotted end of the quadrant 49 to swing over to the right carrying along with it the ends of the springs 60 which are hooked over the studs 51 which are clamped into the slot 50 therein by the nuts 52, a sufficient degree of rotation in the direction of that above described will carry the center line of the right hand spring 60 over towards the center line of the stud 57 on which the right hand bell crank 58 is swiveled and a further continued movement of the quadrant 49 will finally result in the center line of the right hand spring 60 passing over to the right of the center of the stud 57 upon which the right hand bell crank 58 is swiveled finally resulting in the right hand bell crank 58 swinging about the stud 57 as an axis until it fetches up against the other stud 74 as shown by the broken lines. As the right hand bell crank 58 swings about the stud 57 as an axis in a counter-clockwise direction to the position as shown by the dotted lines a corresponding clockwise rotation of the valve 65 is caused by the movement being transmitted thereto by the link 62 and the handle 63, the link 62 has been so proportioned that when the right hand bell crank 58 comes up against the stud 74 as shown by the dotted line the valve 65 being in such a position to afford a clear passageway for the liquid contained in the tank 67 to pass out through the pipe 71 and the nozzle 73. The movement of the valve 65 as above described will be that which would occur when an indication was being made of a shortening of the gauge between the rails of the track 11 below standard. Should the gauge of the track 11 which the test car 10 is passing over now return to standard the shaft 46 will be caused to rotate in a clock-wise direction returning the indicator 53 to the zero point on the scale 55 and causing the right hand bell crank 58 to return to the position as shown by the full line in the drawing and closing the valve 65 in a manner which is the reverse of the process just described, a further rotation of the shaft 46 in a clockwise direction would result in the center line of the left hand spring 60 approaching the center of the stud 57 upon which the left hand bell crank 58 is swiveled and finally passing to the left thereof would cause a sudden clockwise rotation of the left hand bell crank 58 about the stud 57 as an axis and causing the valve 64 to rotate in a clockwise direction also through the medium of the link 62 and the pin 61 which connect the handle 63 of the valve 64 to the left hand bell crank 58. As soon as the center line of the left hand spring 60 passes to the left of the stud 57 the rapid clockwise rotation of the left hand bell crank 58 will continue until it fetches up against the stud 74 as shown by the dotted lines, the link 62 being so proportioned that the valve 64 will then afford a clear passageway for the liquid from the tank 66 to pass through the pipe 70 and the nozzle 72. From the above description of the mechanism operating the valves 64 and 65 it will be appreciated that the apparatus does not permit either valve to take an intermediate position between the open and closed positions; in fact the valves 64 and 65 will make their change from the open to the closed position or vice versa almost instantaneously as the center line of the spiral spring 60 passes to either side of the center of the studs 57. The degree of sensitiveness of the valve actuating mechanism above described in response to changes in the gauge of the track 11 may be adjusted by loosening the nuts 52 on the studs 51 and moving them together with the ends of the springs 60 which are hooked there over towards or away from the ends of the slot 50 in the quadrant 49 thus diminishing or increasing the angle through which the shaft 46 must rotate to bring the center line of the spiral springs 50 to the other side of the center line of the studs 57 and causing the valves 64 and 65 to open or close as above described. The perpendicular distance between the center line of the spiral spring 60 and the center of the stud 57 represents the tolerances which the track gauging apparatus has for any given setting for deviations of the gauge of the track 11 from standard. From the above description of the action of the indicating mechanism shown in Figure IV it will be seen that the valve 65 permits the liquid contained in the tank 67 to flow out through the pipe 71 and the nozzle 73 and impinging on the inside of the web of one of the rails of the track 11 leaving a permanent mark thereon as long as the valve 65 is open when the wheels of the track gauging apparatus shown in Figures III and IV approach each other, due to the distance between the rails of the track 11 diminishing and the other valve 64 permits the liquid contained in the tank 66 to flow out therefrom through the pipe 70 and the nozzle 72 and impinging against the inside of the web of one of the rails of the track 11 whenever the two wheels 17 and 19 shown in Figures II and V move away from each other due to the distance between the rails of the track 11 increasing, neither valve opening while the other is open. It will be seen that an appreciable time will elapse after the wheels 17 and 19 have entered a section of the track 11 where the gauge is above or below standard before the valve 64 or 65 will function which is compensated for by placing the nozzles 72 and 73 at the proper distance to the rear of the wheels 17 and 19 as shown in Figure I so that by the time the nozzles 72 and 73 which are shown in Figure I under the numbers 14 and 13 approach that section of the track 11 which is not standard in gauge, the appropriate liquid in the tank 66 or 67 will be just at the point of emerging from the nozzle 72 or 73 and make a visible mark on the inside of the web of one of the rails of the track 11 at the proper place. The liquid contained in the tank 66 should be of a different color from that contained in the tank 67 so that a mark will be left on the web of the rail of the track 11 when the gauge of the track is below standard which will contrast strongly with the mark which is left thereon when the gauge is above standard. The distance that the nozzles 72 and 73 are mounted on the test car 10 to the rear of the wheels 17 and 19 should be so proportioned that correct functioning of the apparatus will be obtained when the fixed running speed of the test car 10 is also maintained.

As various possible embodiments might be made of the above invention and as various changes might be made in the embodiment above set forth, it is to be understood that all matter herein set forth or shown in the accompanying drawings is to be interpreted as illustrative and not in a limiting sense.

We claim:

1. In testing apparatus for railway tracks, in combination, a pair of flanged wheels mounted to roll along the rails, means adapted to urge said wheels outwardly to hold them against the inner surfaces of the rails, means mounting said wheels and adapting them to move relatively toward and away from one another and to collectively move laterally with respect to said mounting, and means adapted to indicate the movement of said wheels either to a greater or lesser than normal distance apart, said indicating means being independent of the collective lateral movement of said wheels with respect to said mounting.

2. In testing apparatus for railway tracks, in combination, a pair of members adapted to engage the inner surfaces of the rails, means mounting said members and adapting them for relative movement toward or away from one another, means urging said members outwardly against the rails, means adapted upon relative movement of said members lessening from normal the distance therebetween to leave a mark upon the track, and means adapted upon relative movement of said members increasing from normal the distance therebetween to leave a record upon the track.

3. In testing apparatus for railway tracks, in combination, a pair of members adapted to engage the inner surfaces of the rails, means mounting said members and adapting them to move relatively to a distance apart greater than or less than that of their normal spacing apart, means urging said members outwardly toward the rails and means adapted to leave distinctive records on the track as said wheels become abnormally close together or abnormally far apart.

4. In testing apparatus for railway tracks, in combination, a pair of members adapted to engage the inner surface of the rails, means mounting said members and adapting them to move relatively toward or away from one another, means urging said members outwardly into engagement with the rails, means adapted upon actuation to leave a record upon the track, means adapted upon a predetermined relative lateral movement of said members in either direction to actuate said record forming means and means adapted to propel said members along a track and comprising connecting means adapting said members for movement collectively with respect thereto.

5. In testing apparatus for railway tracks, in combination, a pair of members adapted to engage the inner surface of the rails, means mounting said members and adapting them to move relatively to a distance apart greater than or less than that of their normal spacing apart, means urging said members outwardly into engagement with the rails, means adapted upon actuation to leave a record upon the track, means adapted upon a predetermined relative lateral movement of said first members to actuate said record forming means and means adapted to adjust the degree of said relative lateral movement required to actuate said record forming means.

6. In testing apparatus for railway tracks, in combination, a pair of members adapted to engage the inner surface of the rails, means mounting said members and adapting them to move relatively toward or away from each other, means urging said members outwardly toward the rails, visual means adapted to indicate relative lateral movement of said members in either direction from their normal spacing, a marking device adapted to leave a mark upon said rails upon relative lateral movement of said members in either direction out of their normal spaced relation, and common means connected to said members adapted to actuate both said visual means and said marking device.

In witness whereof, we hereunto subscribe our names.

ROBERT S. BLAIR.
BURLING D. WELLS.